Figure 1:
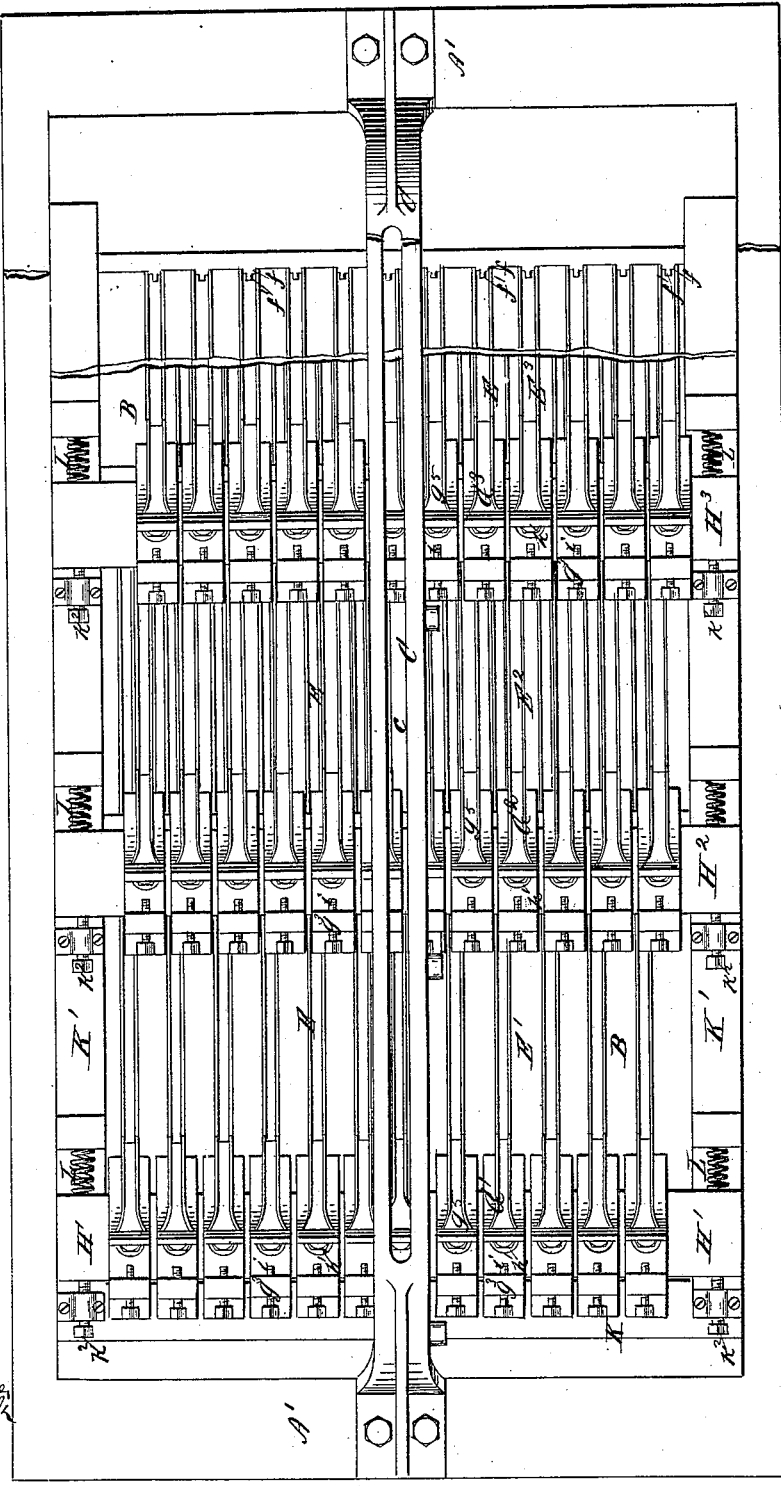

(No Model.) 6 Sheets—Sheet 1.

L. K. JOHNSON & A. A. LOW.
TYPE DISTRIBUTING APPARATUS.

No. 421,001. Patented Feb. 11, 1890.

Witnesses:
Inventors:

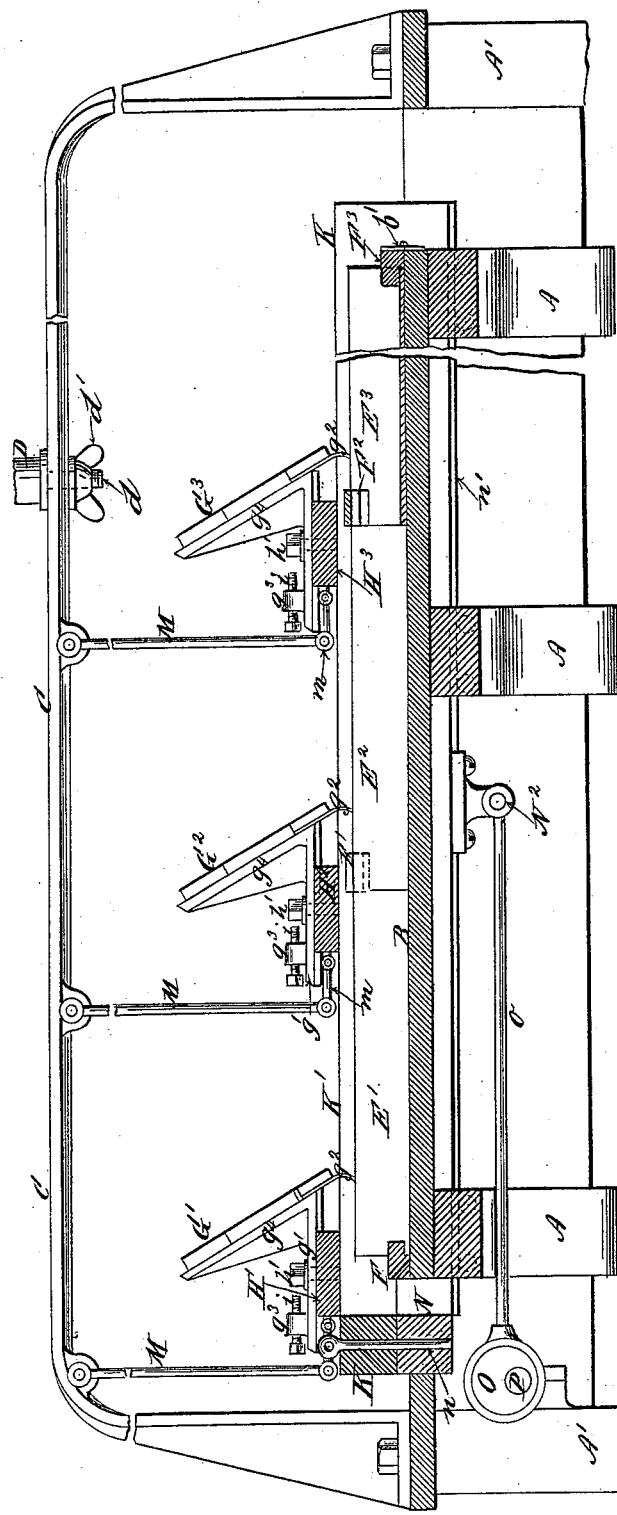

(No Model.) 6 Sheets—Sheet 3.
L. K. JOHNSON & A. A. LOW.
TYPE DISTRIBUTING APPARATUS.
No. 421,001. Patented Feb. 11, 1890.
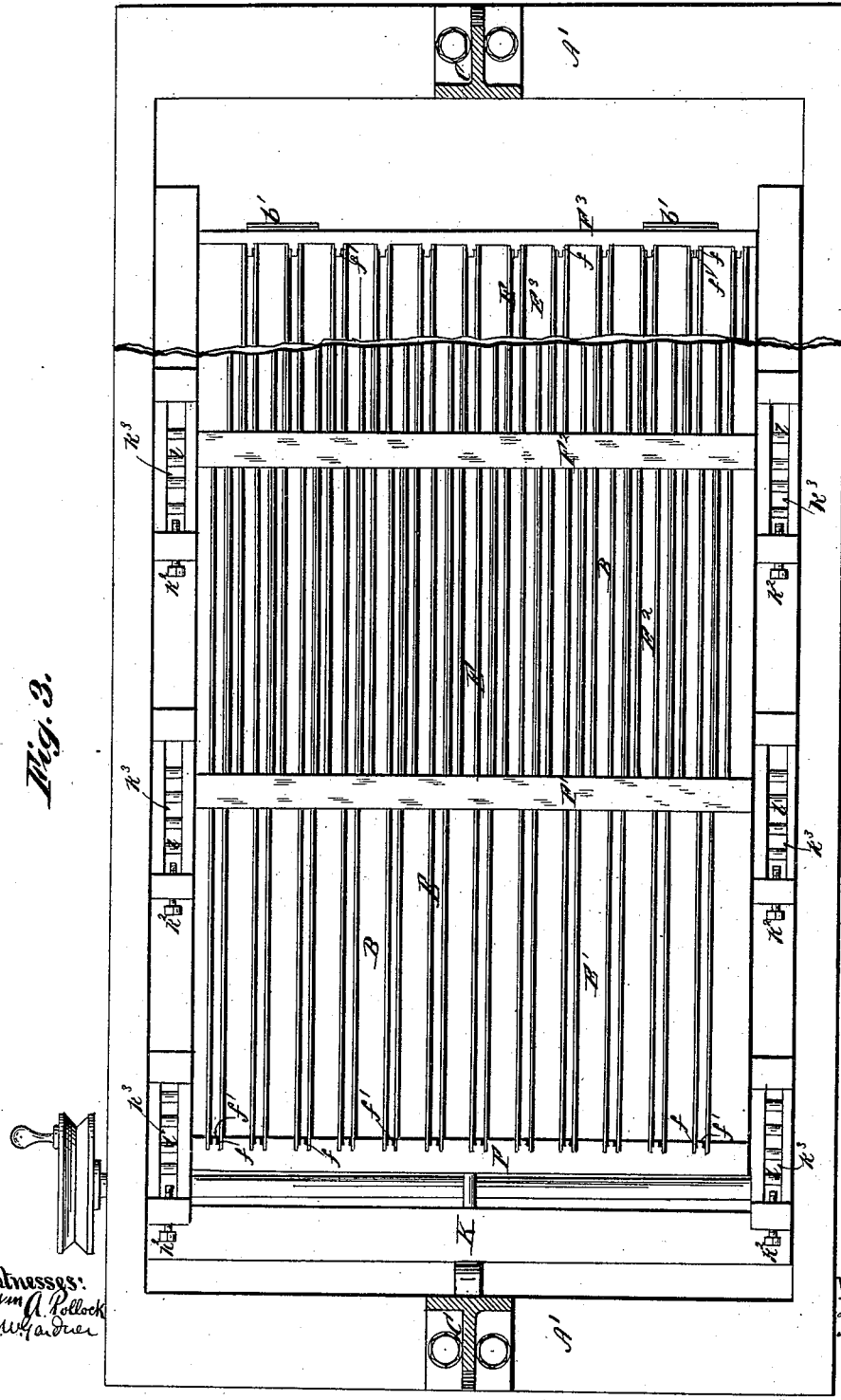

(No Model.) 6 Sheets—Sheet 4.
L. K. JOHNSON & A. A. LOW.
TYPE DISTRIBUTING APPARATUS.
No. 421,001. Patented Feb. 11, 1890.
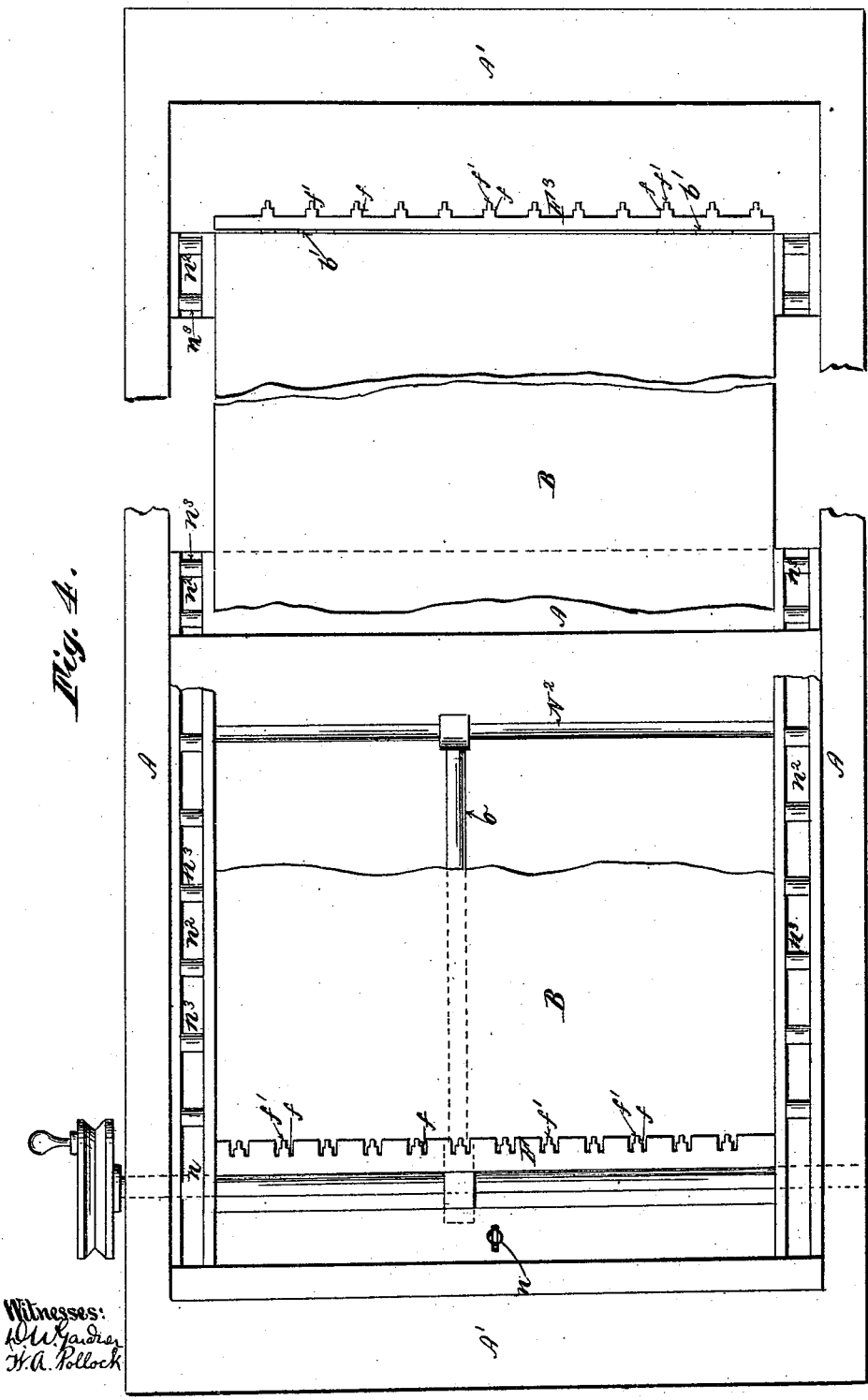

(No Model.) 6 Sheets—Sheet 5.
L. K. JOHNSON & A. A. LOW.
TYPE DISTRIBUTING APPARATUS.
No. 421,001. Patented Feb. 11, 1890.
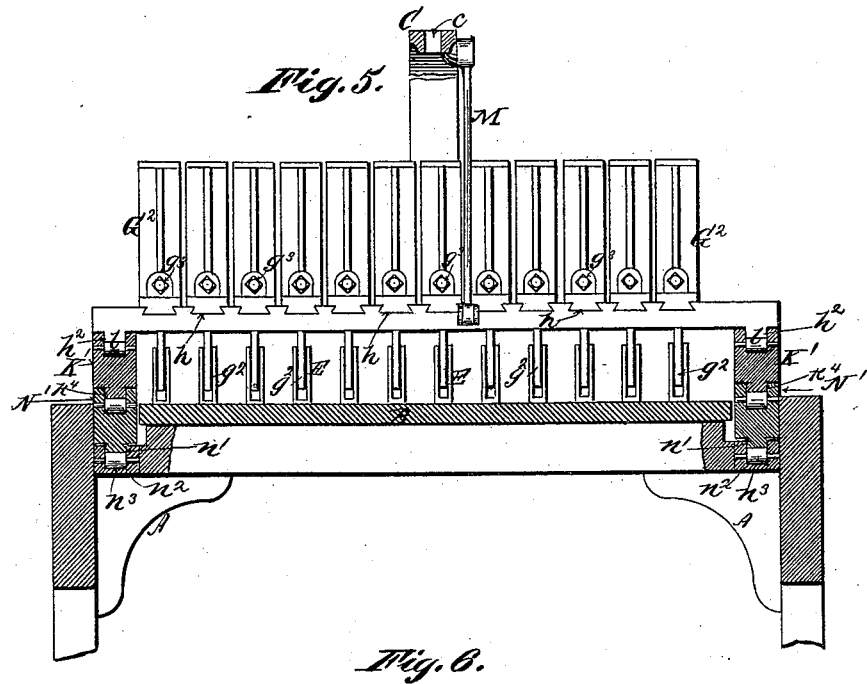
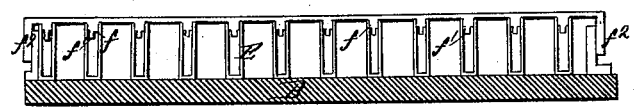
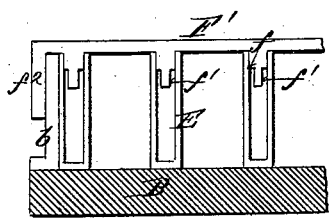 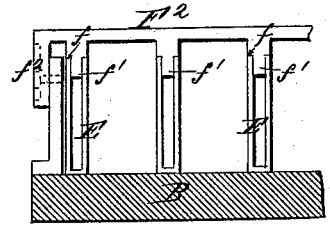
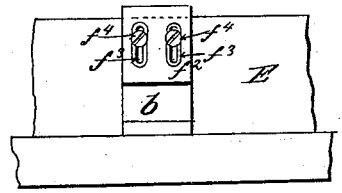

(No Model.) 6 Sheets—Sheet 6.
L. K. JOHNSON & A. A. LOW.
TYPE DISTRIBUTING APPARATUS.
No. 421,001. Patented Feb. 11, 1890.
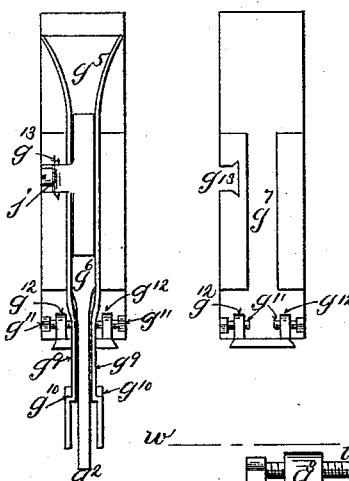
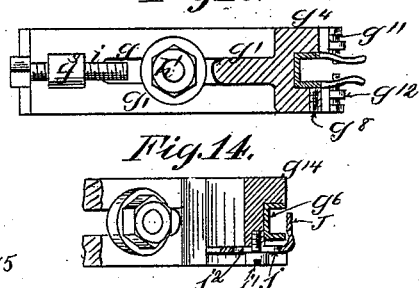
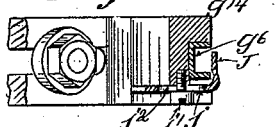
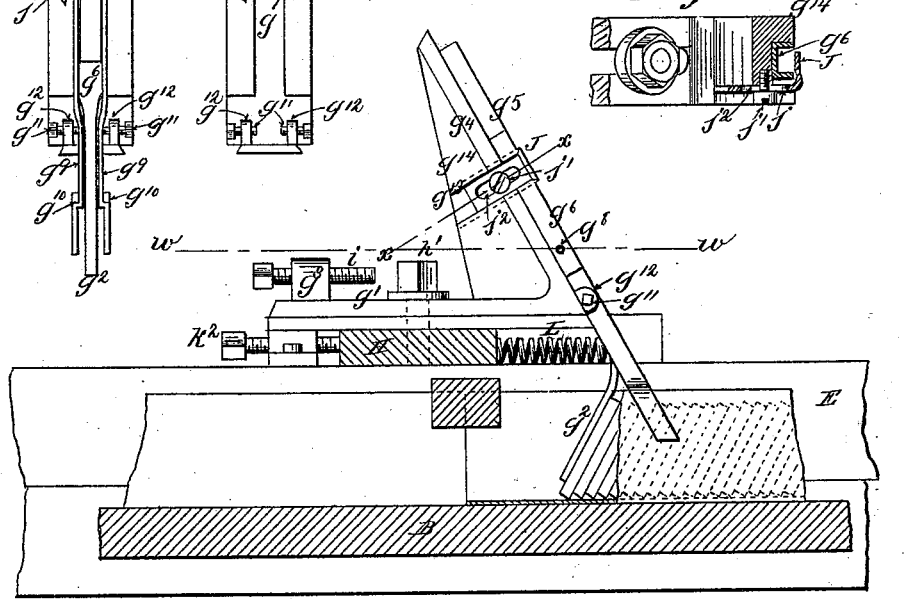
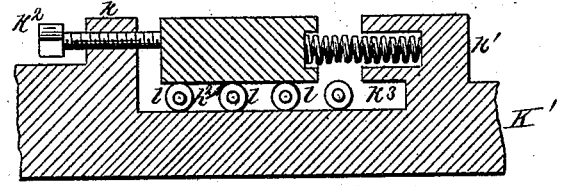
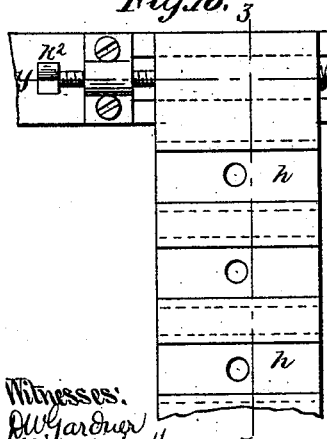
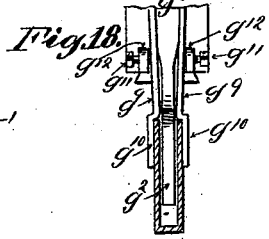
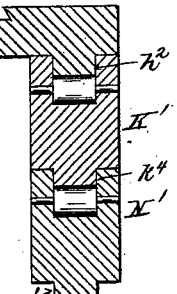
Witnesses:
D. W. Gardner
G. T. Miatt
Inventors:
Louis K. Johnson,
A. Augustus Low
By his attorney
Geo. W. Miatt

UNITED STATES PATENT OFFICE.

LOUIS K. JOHNSON AND ABBOT AUGUSTUS LOW, OF BROOKLYN, ASSIGNORS TO THE ALDEN TYPE MACHINE COMPANY, OF NEW YORK, N. Y.

TYPE-DISTRIBUTING MACHINE.

SPECIFICATION forming part of Letters Patent No. 421,001, dated February 11, 1890.

Application filed August 25, 1887. Serial No. 247,882. (No model.)

*To all whom it may concern:*

Be it known that we, LOUIS K. JOHNSON and ABBOT AUGUSTUS LOW, citizens of the United States, residing in the city of Brooklyn, in the county of Kings and State of New York, have invented certain new and useful Improvements in Type-Distributing Apparatus, of which the following is a specification sufficient to enable others skilled in the art to which the invention appertains to make and use the same.

Our improvements relate, generally, to apparatus for receiving and distributing types into containing-channels, in which they are arranged in line in prescribed position with relation to each other.

Specifically, the main object of the invention is the adaptation, arrangement, and combination of parts, substantially as hereinafter set forth, for utilizing for a full case or font of types the principle involved in Letters Patent No. 363,836, issued to A. Augustus Low May 31, 1887, in which the type receiving and conducting device is adapted to be reciprocated longitudinally with relation to the containing-channel for the purpose of forwarding the types therein, in addition to the ordinary function of simply depositing the types in the said channel.

In the present case we have shown the several independent receivers and forwarders as single in construction and arranged to forward the types in one direction only; but the duplex form of holder described in the Low patent referred to may be substituted, when preferred, without material change or deviation from the essential features of construction involved in our present invention.

A leading feature of our present construction consists in forming and arranging the parts in such manner that the combined receivers and forwarders may be reciprocated individually or collectively, or in series, as preferred, and by the employment of either hand or motor power. By this means a single apparatus is adapted to a greater variety of uses than the older forms of distributers, and can be used with equal advantage either in large shops, where power is abundant, or in smaller shops, where hand-power alone can be relied upon.

Another important feature of our present invention consists in rendering the combined receivers and forwarders automatic in their return to a normal position after forwarding the types in the containing-channels, thus insuring the opening of the "throats" or spaces for the reception of the heels of the succeeding types. There is also a novel arrangement of the individual receivers and forwarders in two, three, five, or more series, as preferred, each series being mounted upon an independent cross-bar or support, and being capable of reciprocation either alone or in conjunction with the other series. By this means we are enabled to make the individual receivers and forwarders comparatively wide and commodious, since each may be made of a width equal to that of the number of type-containing channels intervening—that is to say, for instance, if the receivers are arranged in three series, their individual widths may be equal to that of three type-containing channels. If they are divided into five series, a width of five channels will be available for each, and so on. The receivers themselves are also novel in construction in that their lower ends are flexible and adjustable, for the purpose of adapting them to types and containing-channels of various sizes, and in that their lower side walls are also formed to clasp the exterior sides of the type-containing channels between them, while their inner surfaces connect with and form continuations of the inner surfaces of the side walls of the said channels. By this means a continuous unbroken path is formed for the guidance of the descending types free from abrupt angles or shoulders, the natural curvature of the side walls under pressure guiding the types evenly and smoothly into their respective type-containing channels.

We are aware that in Patent No. 336,645, issued to Johnson and Low February 23, 1886, receivers having adjustable side walls for the purpose of contracting the lower portions of the type-passages are shown, and we do not herein seek to claim such adjustment broadly; but in the patent referred to the side walls are stiff or rigid and are pivoted to their bed-plate, whereas in the present case we make the side walls of the conduits continuous, but comparatively elastic, so that by the external pressure of adjusting-screws the opposite extremities may be varied with relation to each other, and we confine our claim to the special construction set forth. In this connection we also employ a special form of adjustable guard for insuring the descent of the types through the receiver-passages upon their flat or broad sides, the guard-surface being extended longitudinally in the passage a sufficient distance to counteract the tendency the smaller and thinner types have to execute a gyratory movement when thrown into the receiver, experience having demonstrated that such types will turn upon their longitudinal axes, even after passing underneath the guard, when the latter is merely a thin bar interposed transversely in their path. We also herein introduce a new feature relating to the combined receiver and forwarder by providing means by which the stroke or extent of reciprocal movement may be gaged and regulated under all circumstances. In the practical use of the combined receiving and forwarding device this feature is of importance in rendering its action uniform, so that all the types may be treated under like conditions. Where the stroke is variable, an excess of motion in forwarding the types will create a space which is too large for the proper reception and control of the next succeeding type, whereas insufficient motion will cause succeeding types to fall upon the faces of those preceding.

In order to regulate accurately the position of the pushing-finger or extension of the floor of the receiver-conduit into the containing-channel with relation to the types to be forwarded, we make said forwarding-finger or extension adjustable vertically. This may be accomplished in any suitable manner, and we do not confine ourselves to the special construction shown in the drawings in this respect, in which, as a matter of convenience, the receiver-conduit and extension or pusher-finger are all formed in one piece and are adjustable vertically upon a frame or carriage.

A feature of our special construction and arrangement of parts is that the receivers and forwarders are interchangeable both individually and in series, each receiver being capable of removal and substitution with relation to the cross-bars, and the latter being bodily removable and interchangeable with relation to the respective seats upon their supporting frame or carriage.

Another feature of novelty in our present construction of distributing apparatus consists in the special forms of holders used for retaining and centralizing the type-containing channels in position upon their supporting bed or table. The one at the left-hand end of the apparatus rests horizontally upon the table, as does the one at the right-hand extremity; but the latter is hinged to the table or support in such manner that it may be swung back and down out of the way when required for the purpose of facilitating the removal of the type-containing channels from that end of the apparatus. The intermediate holders, rendered necessary by the special arrangement of the type-containing channels in series to conform to the division of the receivers into series, are arranged to project downward vertically into the channels. These holders all resemble each other in that they are each "graduated," or formed with projecting tongues adapted to engage with and hold two or more sizes of type-containing channels. We are aware that in Patent No. 282,988, issued to Johnson and Low August 14, 1883, beveled or wedge-shaped holders are shown, to be used in conjunction with type-containing channels of different sizes having their ends flared to correspond to the holders; also, that in Patent No. 354,149, issued to Johnson and Low December 14, 1886, space bars or bridges are used, extending over and engaging with the upper edges of the channels, and we disclaim herein the special construction of parts shown in the said patents.

In the present case the novelty in the construction of the holders consists in forming them each with two or more series of distinct shoulders to adapt them to engage with and hold the extremities of type-containing channels, the side walls of which are unchanged and parallel throughout their entire extent. Furthermore, the intermediate holders used upon the tops of the channels in the present case are rendered necessary by the peculiar arrangement of the channels in series parallel to and alternating with each other, and they are further necessarily provided with means by which they may be adjusted vertically, in order to regulate their several offsets or shoulders with relation to the particular width of channel to be used. As before intimated, each cross-bar carrying a series of combined receivers and forwarders is capable of independent reciprocation upon its frame or carriage, and in order that this may be conveniently accomplished by hand we couple each, when required, to a swinging lever or handle, which may be pushed readily in either direction. These oscillating handles or levers are suspended from a bridge-piece extending centrally and longitudinally above the apparatus. The said bridge is slotted longitudinally for the reception of a screw-stud projecting downward from the base of the "breaker-standard," which is secured underneath by a locknut. It is not deemed necessary to show and describe herein the construction of the said breaker or line-separator, since reference may be had to Patent No. 277,740, issued to L. K. Johnson, May 15, 1883, and to Patent No. 341,125, issued to Johnson and Low, April 20, 1886, for a full understanding of the matter, and we have therefore herein simply shown the lower portion of the breaker-standard provided with means for securing it adjustably to the bridge, since the essential feature in this connection is the adjustment of the breaker longitudinally over the apparatus to suit the will or convenience of the operator. For this reason the standard may be made to straddle a rail, upon which it may be held in position by a set-screw, or any other alternative construction may be substituted for the slotted bridge. In fact, the bridge itself is shown in our Letters Patent, No. 360,096, of March 29, 1887, and we herein seek to cover the special features of adjustability only.

It is to be understood that we do not confine ourselves strictly to the identical form and construction of parts shown in the drawings, since various modifications and changes may be made in the several parts of the apparatus without deviating materially from the spirit and intent of our invention.

In the accompanying drawings, in which similar letters refer to like parts throughout the several views, Figure 1 is a plan of an apparatus embodying our improvements, a portion near the right-hand end being broken away. Fig. 2 is a vertical longitudinal section of the same. Fig. 3 is a plan similar to Fig. 1, except that the cross-bars, &c., are removed and the standards of the bridge are shown in horizontal section; Fig. 4, another similar plan, in which the type-containing channels, cross-bars, frame, or carriage are removed and the channel-bed is broken away to show the pitman for actuating the lower frame or carriage. Fig. 5 is a vertical transverse section of the apparatus looking toward the right. Fig. 6 is a transverse section of the type-channel-supporting bed, showing one of the intermediate or vertical channel-holders. Fig. 7 is an enlarged detail of a portion of a vertical channel, illustrating its use in connection with channels of maximum width; Fig. 8, a similar view illustrating its use in connection with channels of less width. Fig. 9 is an end view of one of the vertical holders and adjoining parts, illustrating means for effecting its vertical adjustment. Figs. 7 to 17, inclusive, are upon a scale of twice the size of the preceding views. Fig. 10 represents a vertical section of one of the cross-bars adjoining the holder and portion of the type-channel support or bed, showing one of the combined receivers and forwarders in elevation. Fig. 11 is a front view of a receiver, &c., taken upon plane parallel to its face; Fig. 12, a similar view of the frame or support with the receiver-channel and guard removed. Fig. 13 is a horizontal section upon plane of line $w$ $w$, Fig. 10; Fig. 14, a transverse section upon plane of line $x$ $x$, Fig. 10. Fig. 15 is a vertical section taken upon plane of line $y$ $y$, Fig. 16; Fig. 16, a plan of one extremity of one of the cross-bars and adjoining parts; Fig. 17, a vertical section upon plane of line $z$ $z$, Fig. 16; Fig. 18, a transverse vertical section of a type-containing channel, looking toward a receiver and forwarder, and showing the manner in which the lower extremities of the conduit-walls straddle and engage the side walls of the said channel.

The type-channel support or bed B is supported upon any usual frame or standards A, the end members A' A' of which also sustain the breaker-bridge C. The latter is formed with the longitudinal slot $c$, through which the threaded stud $d$, projecting downward from the lower extremity of the standard D of the breaker, projects sufficiently to permit of its being secured by the set-nut $d'$. The breaker-standard is shown as broken away immediately above the bridge C, and reference may be had to Patents Nos. 341,125 and 277,740, hereinbefore mentioned, for an understanding of the nature and object of this device, the object herein being simply to provide a means of adjusting the breaker along the apparatus when desirable either to bring it into more convenient position for use or to move it out of the way entirely when not in use. It is obvious that the longitudinal adjustment of the breaker with relation to the machine may be effected by other well-known means than the slot and set-screw shown in the drawings, and equivalent means may be substituted without material alterations in any of the parts.

The bed B is horizontal, or substantially so, and the type-containing channels E are arranged thereon in two, three, or more series, according to the number and requirements of the types to be used. In the accompanying drawings the channels are shown as arranged in three series E' E$^2$ E$^3$, although in practice we design dividing them into five series of twenty each. As shown, the intervening spaces between the channels in each series are equal to the width of two channels. The extreme left ends of the first series E' are centralized and held laterally by the holder F and the corresponding ends of the other series E$^2$ E$^3$ by the intermediate holders F' F$^2$. These holders, as well as the right-hand end holder F$^3$, are each provided with a series of channel-engaging shoulders $f$ $f'$. When the channels are placed in position, the shoulders $f$ $f'$ project into them and rest against their inner side walls, as illustrated in Figs. 1, 3, 6, 7, and 8. The shoulders $f$ are for the engagement of the larger width of channel, as shown in Figs. 6 and 7, while the shoulder $f'$ affords like support for the narrower channels, as illustrated in Fig. 8.

Provision is made for only two different widths of channels in the drawings; but it is obvious that provision may be made in like manner for other sizes upon the same principle, the novelty claimed in this connection being the construction of the holders with parallel-sided projections which enter the channels and engage the side walls thereof, which projections are formed with two or more offsets or differences in width, corresponding to the difference in the internal width of the containing-channels to be used.

In order to adjust the intermediate holders F' F² to correspond to the differences in width of the channels, as illustrated in Figs. 7 and 8, they are made adjustable vertically. This may be accomplished by any suitable or appropriate means. As an example, the holders may be provided with the downwardly-projecting flanges $f^2$ $f^2$ at each extremity, formed with vertical slots $f^3$ $f^3$, which are countersunk to receive the heads of the set-screws $f^4$ $f^4$, which engage with female screw-threads in the standards $b$ $b$, although we do not wish to limit ourselves to any particular means of adjustment in this respect. The right-hand end holder F³ is attached to the channel-bed B by hinges $b'$ $b'$, or by other means which will permit of its being swung back, as shown in Fig. 4, out of the way of the type-containing channels during the removal of the latter.

The several series of receivers and forwarders G' G² G³ are respectively mounted above the corresponding series of type-containing channels E' E² E³ upon independent removable cross-bars H' H² H³. The receivers G' G² G³ are secured to the cross-pieces within grooves $h$ $h$ by means of set-screws $h'$ $h'$, which pass through longitudinal slots $g$ $g$, formed in the bottom flanges $g'$ of the receivers. The slots $g$ $g$ permit of the adjustment of the receivers G' G² G³ horizontally for the purpose of regulating the positions of their forwarding-fingers $g^2$ within the channels. The slots $g$ $g$ also provide for the independent reciprocation of the holders when desired, since by loosening the set-screws $h'$ $h'$ sufficiently they may each be readily moved back and forth in the grooves $h$ $h$. In order to gage or limit such individual motion, we employ an adjustable stop $i$, preferably, though not necessarily, in the form of a screw, which engages with a female screw-thread formed in a lug $g^3$, projecting upward from the bottom flange $g'$. The bolt $h'$ affords a convenient fixed stop, against which the end of the screw $i$ rests at the termination of the forward stroke, and the extent of the latter is therefore readily varied by turning the screw as required. The back-stroke of the receiver may be limited in like manner, if desired, otherwise the end of the slot $g$ will limit the motion in that direction. The front flange $g^4$ of the receiver is inclined at an angle suitable for the descent of the types. The receiver-cup $g^5$ and conduit $g^6$ are preferably formed out of one piece of sheet metal bent or stamped up into the required form and supported in a groove $g^7$, formed in the face of the inclined front flange $g^4$. The sides of the groove are parallel and, preferably, only extend a distance slightly less than the parallel side walls of the conduit $g^6$, which latter is in such case held in the desired position against longitudinal movement by one or more small set-screws $g^8$, (shown in Figs. 10 and 13,) by which it will be seen that the adjustment of the lower end of the conduit $g^6$ (including its floor-extension or pusher-finger $g^2$) may readily be accomplished by loosening the said screw or screws, sliding the receiver-conduit longitudinally in either direction, and then retightening the screws.

The curved extension or pusher-finger $g^2$ is formed of a width slightly less than the interior width of the smallest channel to be used, and it is bent backward, as heretofore, in order to forward the types in an inclined position. The side walls $g^9$ $g^9$ of the conduit $g^6$ for some distance above the top of the channels are independent of the floor and extension thereof $g^2$, and, being made of suitable sheet metal, are sufficiently elastic to conform to the size of the particular type-containing channels in use. Their lower extremities are formed with offsets $g^{10}$ $g^{10}$, which compensate for the thickness of the channel side walls and enable them to clasp the latter externally, as shown in Fig. 18.

The lower ends of the conduit side walls $g^9$ $g^9$ are governed in position with relation to each other by set-screws $g^{11}$ $g^{11}$, engaging the lugs $g^{12}$ $g^{12}$, projecting from the face of the inclined flange $g^4$ and bearing more or less against the exterior sides of the said walls $g^9$ $g^9$, as shown in Fig. 11. Provision is thus made not only for grasping the channels externally, but also for forming a continuous lateral conducting-surface from the receiver-cup $g^5$ to the bottom of the channel itself free from all abrupt corners or obstructions.

The guard J extends longitudinally over the upper portion of the conduit $g^6$, and is adjustable with relation to the bottom of the conduit in order to compensate for the differences in the thickness of the types to be distributed. We are aware that guards in this connection are old, and we only seek to cover herein the special construction shown, a feature of which is the usual extension of the guard lengthwise of the conduit for the purpose of holding down the types positively against turning upon their longitudinal axes until they have descended a sufficient distance to lose all lateral momentum. The guard is secured to the frame of the receiver by means of the rectangular flange $j$, which rests in a groove $g^{13}$, formed in the rib $g^{14}$. In order to hold it rigidly in a rectangular position, and also to afford the necessary degree of adjustment, the flange $j$ is clamped against the rib $g^{14}$ by a set-screw $j'$, which passes through the elongated slot $j^2$. (Shown in Figs. 10 and 14.)

The ends of the cross-bars H' H² H³ are supported upon a rectangular frame K, which is capable of reciprocation. The side members K' K' of the said frame are recessed to receive the ends of the cross-bars, or, what amounts to the same practically, are formed with confining-shoulders $k$ $k'$, which limit the degree of lateral horizontal movement provided for the said cross-bars. One (or both, if preferred) of these retaining-shoulders $k\ k'$, at each end of a cross-bar, is provided with means for limiting the extent of movement or stroke of such cross-bar.

Of course we do not wish to confine ourselves to any special form of means for regulating and limiting the stroke of the cross-bars, and the set-screws $k^2\ k^2$ are employed in the accompanying drawings as the most convenient form of illustrating the essential feature of construction involved in this feature of our invention. As shown, the set-screws are arranged to limit the back-stroke of the cross-bars. If the degree of forward penetration of the pusher-fingers $q^2$ is required to be adjusted, this can be readily effected upon the individual receivers themselves by means of the set-screws $h'\ h'$, as hereinbefore indicated.

In order to effect the retractile stroke of the cross-bars automatically, we arrange springs L at either end in any appropriate manner, which tend constantly to retain them in a normal position against the stops $k^2\ k^2$. These springs, as shown in the drawings, are seated in opposed recesses formed, respectively, in the front edges of the cross-bars and the rear sides of the stops or shoulders $k'\ k'$, although it is obvious that they may be arranged to pull instead of push, or may even be superseded by weights or other equivalent means of effecting the desired retractile movement. The cross-bars H' $H^2$ $H^3$ are held against longitudinal movement by transverse tenons $h^2\ h^2$, formed upon their under sides, which tenons rest in grooves $k^3\ k^3$, formed in the side members K' K' of the supporting-frame K, as will be seen by reference to Figs. 15, 16, and 17. In order to render the reciprocation of the cross-bars smooth and easy, anti-friction rollers $l\ l$ are arranged in the bottom of the grooves $k^3\ k^3$ in such manner that the tenons $h^2\ h^2$ rest thereon. The reciprocation of the cross-bars may be effected directly by hand in any desired manner. As a convenient means of accomplishing this, we show in the drawings handles M M, pivotally suspended from the bridge C above, to the lower extremities of which the cross-bars are coupled by links $m\ m$. A slight forward push upon one of the suspended rods will thus be sufficient to cause the reciprocation of an entire series of receivers and forwarders, or all the cross-bars with their series of receivers may be simultaneously reciprocated either by hand or continuously by power through the medium of the supporting-frame K. In order to afford this choice between hand or motor power, the primary supporting-frame K is in turn mounted upon a secondary supporting-frame N, adapted to be reciprocated by suitable mechanism, and when it is desired to employ power to effect a continuous reciprocation of the receivers the two frames K and N are coupled or connected together by suitable means—as, for instance, the coupling-pin $n$, (shown in Fig. 2 of the drawings,) or any other mechanical equivalent. The side members N' of the secondary frame N are grooved longitudinally and provided with anti-friction rollers for the reception and support of longitudinal ribs or tenons $K^4\ K^4$, formed upon the under sides of the side members K' of the frame K, and in like manner the under sides of the said side members N' of the secondary frame N are formed with ribs or tenons $n'$, which engage grooves $n^2$ and rollers $n^3$ in the standards A A, or other stationary portions of the main frame of the apparatus.

A positive reciprocal movement is imparted to the lower or secondary frame by any suitable mechanism, as by means of the eccentric O and connecting-rod $o$ in the drawings, which transmit the necessary power from the driving-shaft P to the cross-bar $N^2$, attached to and extending between the side members N' N'.

It is to be understood that certain features of our invention are equally applicable to a single receiving and forwarding device used in connection with a single type-containing channel, as in the Low Patent, No. 363,836, hereinbefore referred to. For instance, the feature of limiting and regulating the stroke of the receiver is novel and equally valuable, whether applied to a single channel or to a series of them, and the special features of construction in the receiver itself, herein described, are also adapted to be used in connection with a single receiving-channel.

What we claim as our invention, and desire to secure by Letters Patent, is—

1. In type-distributing mechanism substantially such as described, the combination of a type-containing channel, a reciprocating type-receiver and forwarder, and an adjustable stop for regulating the extent of movement of the said reciprocating type receiver and forwarder, for the purpose and substantially in the manner described.

2. The combination of a type-containing channel, a type receiver and conduit having side walls the lower portions of which are adjustable with relation to each other and to the said type-containing channel, and means, substantially such as described, for effecting the adjustment of the said flexible side walls, substantially in the manner and for the purpose described.

3. The combination, with a type-containing channel, of a type receiver and conduit formed with side walls the lower portions of which are flexible, and with shoulders or offsets for clasping the upper edges and exterior sides of the said type-containing channel, substantially in the manner and for the purpose described.

4. In combination with a type-containing channel, and with a type receiver and conduit formed with side walls the lower ends of which are flexible, adjustable bearings for positively regulating the position of the said flexible ends of the side walls with relation to each other and to the width of the type-containing channel, for the purpose and substantially in the manner described.

5. In combination with a type-containing channel, a combined type receiver and forwarder, substantially such as described, consisting of an inclined support and a type receiving and forwarding conduit which is adjustable vertically upon the said support and with relation to the said type-containing channel, substantially in the manner and for the purpose described.

6. In a type-distributing apparatus substantially such as described, the combination, with the single type-receiver $g^5$, and the conduit $g^6$, both extending in the same inclined plane, of an elongated type-guard J, occupying a parallel plane above the floor of the said receiver and conduit, for the purpose and substantially in the manner set forth.

7. The type receiver $g^5$ and conduit $g^6$, provided with the elongated type-guard J, having the slotted rectangular flange $j$ and adjusting-screw $j'$, substantially in the manner and for the purpose described.

8. In a type-distributing apparatus substantially such as described, a type-containing channel, a reciprocating type receiver and forwarder, an independent support for the latter, and a holder for retaining the said receiver and forwarder upon the independent support while permitting of its reciprocation thereon, for the purpose and substantially in the manner described.

9. In a type-distributing apparatus substantially such as described, a type-containing channel, a reciprocating type receiver and forwarder, and an independent support for the latter, formed with an adjustable stop for regulating the extent of reciprocal motion, substantially in the manner and for the purpose described.

10. In a type-distributing apparatus substantially such as described, the combination of a type-containing channel, a reciprocating type receiver and forwarder formed with a longitudinal slot $g$, an independent support for the said reciprocating receiver and forwarder, a set-screw $h'$, passing through the longitudinal slot $g$ and engaging with the independent support, and an adjustable stop $i$ upon the reciprocating receiver and forwarder, for the purpose and substantially as shown.

11. The combination of a type-containing channel, a combined type receiver and forwarder, and a reciprocating support for sustaining said type receiver and forwarder independent of the said type-containing channel, substantially in the manner and for the purpose described.

12. In a type-distributing apparatus substantially such as described, the combination of a type-containing channel, a combined type receiver and forwarder, an independent reciprocal support for the said combined receiver and forwarder, and adjustable stops for regulating the extent of reciprocation of the said independent support, the whole arranged and operating substantially in the manner and for the purpose described.

13. In a type-distributing apparatus substantially such as described, the combination, with a type-containing channel, of a combined type receiver and forwarder, an independent support for the said type receiver and forwarder, and automatic retractors for returning the said receiver and forwarder to its normal position, substantially in the manner and for the purpose described.

14. In a type-distributing apparatus substantially such as described, the combination of a type-containing channel, a combined type receiver and forwarder, an independent reciprocal support for the said receiver and forwarder, and automatic retractors for returning the said reciprocal support to its normal position, substantially in the manner and for the purpose described.

15. In a type-distributing apparatus substantially such as described, the combination of a type-containing channel, a combined type receiver and forwarder, an independent reciprocal support for the said combined receiver and forwarder, adjustable stops for regulating the extent of reciprocation of the said independent support, and automatic retractors for returning the said independent support to its normal position against the said stops, the whole arranged and operating substantially in the manner and for the purpose set forth.

16. In combination with a type-containing channel, and with a combined type receiver and forwarder attached to an independent support, which is adapted to be reciprocated for the purpose and substantially in the manner described, the adjusting-screw $k^2$ and retractile spring L, arranged and operating substantially in the manner and for the purpose described.

17. In a type-distributing apparatus substantially such as described, the combination of a type-containing channel, a combined type receiver and forwarder, an independent reciprocal support for the said receiver and forwarder, and stationary parallel tracks upon the frame of the apparatus for preserving the alignment of the said independent support, substantially in the manner and for the purpose set forth.

18. In combination with a type-containing channel, and with a combined type receiver and forwarder attached to an independent support which is adapted to be reciprocated substantially in the manner and for the purpose described, the ribs or tenons $h^2$ and elongated grooves $k^3$, arranged and operating substantially in the manner and for the purpose described.

19. In a type-distributing apparatus substantially such as described, the combination of a series of type-containing channels resting upon a stationary support, and a series of combined type receivers and forwarders mounted upon a reciprocating cross-bar or support, which is supported independent of the type-containing channels upon stationary parallel tracks formed upon the frame of the apparatus, substantially in the manner and for the purpose described.

20. In a type-distributing apparatus substantially such as described, the combination of a series of type-containing channels resting upon a stationary support, a series of combined receivers and forwarders, and a reciprocal support for the said receivers and forwarders mounted independent of the containing-channels upon parallel stationary tracks upon the apparatus, and formed with a series of seats $h\,h$ for the reception and support of the said receivers and forwarders, substantially in the manner and for the purpose described.

21. In a type receiving and distributing apparatus substantially such as described, the combination of a series of type-containing channels, a series of combined type receivers and forwarders attached to an independent support which is adapted to be reciprocated substantially in the manner and for the purpose described, and a pivotally-suspended lever linked to the said independent support, substantially in the manner and for the purpose described.

22. In a type-distributing apparatus substantially such as described, the combination, with one or more series of type-containing channels, and with one or more series of combined type receivers and forwarders mounted upon one or more cross-bars or independent supports, of a frame or carriage for the said cross-bars and receivers, which is adapted to be reciprocated substantially in the manner and for the purpose described.

23. In a type-distributing apparatus substantially such as described, the combination of a series of type-containing channels, a series of combined type receivers and forwarders mounted upon a carriage K, a secondary reciprocating power-frame N, arranged underneath and supporting the receiver-carriage K, and a coupling for connecting the said receiver-carriage K and the said power-frame N together, for the purpose and substantially in the manner set forth.

24. In a type-distributing apparatus substantially such as described, the arrangement of the type-containing channels in successive series one in advance of the other, substantially as herein shown and described, in combination with one or more series of independently-supported combined type receivers and forwarders adapted to be reciprocated longitudinally with relation to the said type-containing channels, substantially in the manner and for the purpose described.

25. In a type-distributing apparatus substantially such as described, the combination, with a series of type containing channels, of a holder F for the ends of the said type-containing channels, said holder being formed with shoulders $f\,f'$ of different widths, corresponding to and for the purpose of engaging type-containing channels of different width, substantially in the manner and for the purpose set forth.

26. In a type-distributing apparatus substantially such as described, a vertically-adjustable holder formed with a series of tongues having offsets or shoulders of different widths for the purpose of engaging and holding against lateral displacement type-containing channels of different widths in combination with the latter, substantially as set forth.

27. In a type-distributing apparatus substantially such as described, the combination, with a series of type-containing channels, of a hinged holder for the ends of the channels, adapted to be swung out of its normal position during use, for the purpose and substantially in the manner described.

28. In combination with a type-containing channel, a type receiver and forwarder formed with shoulders or offsets for straddling and clasping the exterior of the type-channel, the said shoulders or offsets being adjustable with relation to each other for the purpose of adapting them to channels of different widths, substantially in the manner and for the purpose described.

LOUIS K. JOHNSON.
A. AUGUSTUS LOW.

Witnesses:
D. W. GARDNER,
GEO. W. MIATT.